No. 647,933. Patented Apr. 24, 1900.
W. F. BECK.
MANIFOLDING SALES BOOK AND HOLDER.
(Application filed May 4, 1899.)
(No Model.)
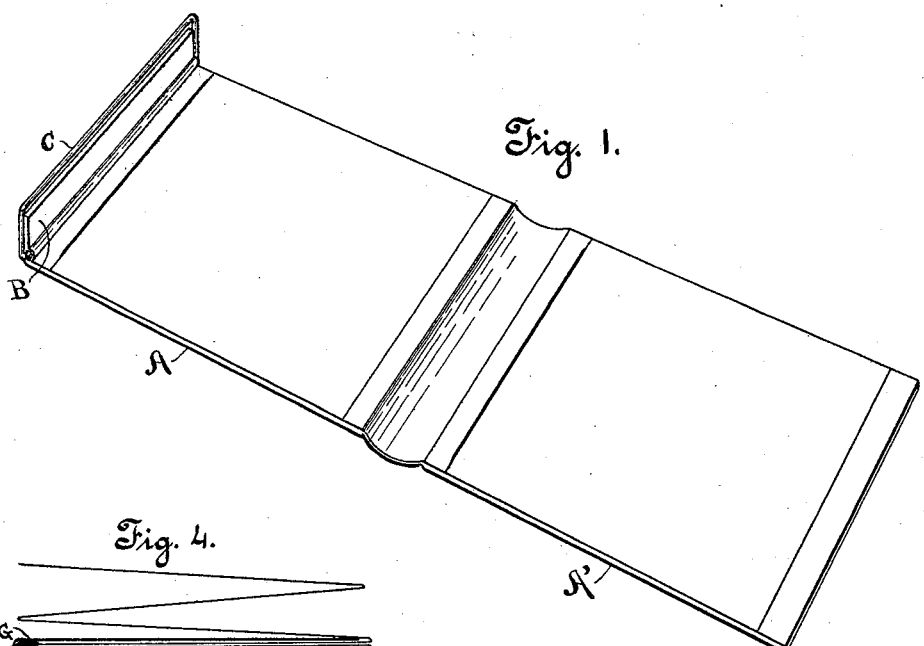
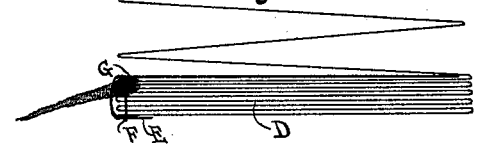
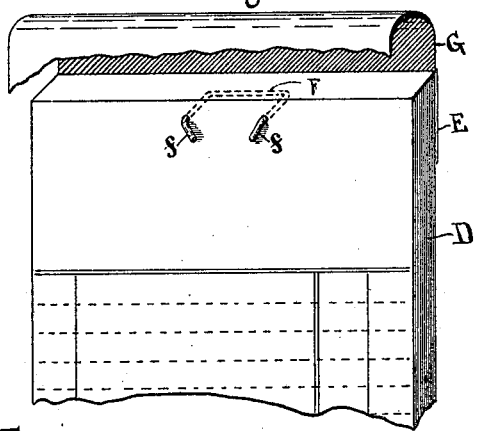
WITNESSES:
INVENTOR
Warren F. Beck
BY Eugene Diven
ATTORNEY

UNITED STATES PATENT OFFICE.

WARREN F. BECK, OF ELMIRA, NEW YORK.

MANIFOLDING SALES-BOOK AND HOLDER.

SPECIFICATION forming part of Letters Patent No. 647,933, dated April 24, 1900.

Application filed May 4, 1899. Serial No. 715,560. (No model.)

*To all whom it may concern:*

Be it known that I, WARREN F. BECK, a citizen of the United States, residing at Elmira, in the county of Chemung and State of New York, have invented certain new and useful Improvements in Manifold-Pads and Holders, of which the following is a specification.

My invention relates to improvements in the pads used by merchants and others for taking manifold copies of orders, &c., and to the holders for such pads; and the objects of my improvements are, first, to provide a simple and cheap form of holder for the pads, and, second, to provide a staple for fastening the leaves of the pad together, whereby the leaves may be separated from the pad easily and without tearing. I accomplish these objects by the construction and arrangement of the parts as illustrated in the accompanying drawings, in which—

Figure 1 represents the holder in perspective; Fig. 2, a side view of the holder with pad in position and one side of bail cut away; Fig. 3, a perspective view of the pad, showing the manner of stapling the leaves together; and Fig. 4, a diagrammatic illustration of the manner of manipulating a zigzag pad the leaves of which are fastened together by my improved staple.

Similar letters refer to similar parts throughout the several views.

A A' represent the leaves of a hinged cover or holder for the pad, the leaf A being made of a stiff material, preferably of tin or other suitable sheet metal, having one end bent up at right angles at B and having a bail C, of wire, hinged in the angle between A and B and extending across the holder. The bail C when turned up in the position shown in Fig. 1 projects a trifle beyond the edge of the portion B.

D is the pad, having attached to its back a stiffish strip of paper E by means of the staple F, which fastens the leaves of the pad together. To place the pad in the holder, the strip E is slipped beneath the bail C, (the bail being in the position shown in Fig. 1,) after which the bail is thrown down into the position shown in Fig. 2, the head of the pad then coming against the bent-up portion B of the holder. It will be seen that the pad is thus held from movement in the holder except when the bail C is thrown back into the position shown in Fig. 1. The bail is preferably made to bind where it is hinged in the angle between A and B, so that it requires some little effort to turn it.

G represents the carbon-sheet, which in this instance is shown stapled to the pad between the strip E and the lower leaf of the pad.

The pad illustrated is of the zigzag or continuous-strip type, the leaves being folded back and forth upon one another and perforated at the folds. In using the pad, therefore, the top leaf will be lifted and the carbon-sheet inserted between it and the next leaf, after writing upon which both original and copy may be severed from the pad, the next original sheet being drawn away from the staple with the copy ready to be laid down upon the carbon-sheet, as shown in Fig. 4.

In Fig. 3 I have shown a pad fastened together with my improved staple. This staple F is driven through the pad from the back, and the short projecting ends $f f$ are bent down against the face of the pad, the novelty of the staple lying in the position given these turned-down ends. Were these ends bent directly toward one another or transverse to the pad they would hold the leaves so securely that each leaf would be torn in pulling it away from the staple. By turning the ends downward, so that they point toward the bottom of the pad, a slight pull will draw the leaves over these bent ends without tearing. If these ends are bent straight down or longitudinally with the length of the pad, the leaves will be apt to pull away from the staple too easily, and I therefore prefer to give said ends a greater or less inclination to the horizontal, according to the requirements of any particular case, it being apparent that the more these ends approach a transverse position the more securely will the leaves be held in place.

Heretofore it has been the practice to make the zigzag pads without any fastening for the leaves in the pad itself, a spring-clamp or similar device upon the pad-holder being relied upon to hold the leaves together. By my improved staple each pad has its leaves securely held together, regardless of the holder, and I am enabled to use in connection with such a pad the very simple and inexpensive holder herein described.

While I prefer to make the leaf A of metal and the leaf A' of cardboard, covering said leaves and hinging them together with cloth, leatherette, or other suitable materials, I do not limit myself in any way to this construction, as it is quite apparent that the leaf A' may be dispensed with entirely, if so desired, and also that only so much of the leaf A may be made of metal as will form and retain the turned-up end portion. Furthermore, it will be obvious that the leaf A' may be hinged to A at the head of the pad instead of at the foot, as shown. The fastening-strip E may also be carried down the full length of the pad instead of being cut short, as shown.

Having thus described my improvements, what I claim as my invention, and desire to secure by Letters Patent, is—

1. The combination, with a pad having a stiffish strip attached to its back in proximity to one end, of a holder therefor, comprising a back piece having one end bent up at right angles and a bail hinged at the angle to engage the strip on the pad and hold the pad in place when said bail is turned down upon the back piece.

2. A pad having its leaves fastened together at one end by a staple passed through from the back with its ends bent down upon the pad and turned in the direction of the free ends of the leaves of the pad.

3. A manifold-pad having its leaves formed in one continuous strip folded together in zigzag fashion and fastened together at one end by a staple passed through from the back with its ends bent down upon the pad and turned in the direction of the free ends of the leaves of the pad, in combination with a stiffish back strip stapled in with the leaves at the back of the pad for the purpose set forth.

4. A manifold-pad having its leaves fastened together at one end by a staple passed through from the back with its ends bent down upon the pad and turned in the direction of the free ends of the leaves of the pad, in combination with a carbon, or transfer sheet and a stiffish back strip stapled in with the leaves at the back of the pad, as and for the purpose set forth.

5. A holder for manifold-pads comprising a stiff back piece having one end bent up at right angles with a bail hinged in the angle and extending across the holder.

In testimony whereof I have affixed my signature in presence of two witnesses.

WARREN F. BECK.

Witnesses:
C. TRACEY STAGG,
ALEXANDER S. DIVEN.